(12) United States Patent
Wang

(10) Patent No.: US 8,400,109 B2
(45) Date of Patent: Mar. 19, 2013

(54) FLASHLIGHT CHARGER

(75) Inventor: Ching-Hsiang Wang, Tainan (TW)

(73) Assignee: Day Sun Industrial Corp., Tainan (TW)

( * ) Notice: Subject to any disclaimer, the term of this patent is extended or adjusted under 35 U.S.C. 154(b) by 313 days.

(21) Appl. No.: 12/882,280

(22) Filed: Sep. 15, 2010

(65) Prior Publication Data

US 2012/0062178 A1 Mar. 15, 2012

(51) Int. Cl.
*H02J 7/00* (2006.01)
*H02J 7/02* (2006.01)
(52) U.S. Cl. ........ 320/114; 320/107; 320/111; 320/112; 320/113; 320/115
(58) Field of Classification Search .................. 320/114, 320/115
See application file for complete search history.

(56) References Cited

U.S. PATENT DOCUMENTS

| | | | |
|---|---|---|---|
| 6,316,911 B1 * | 11/2001 | Moskowitz et al. | 320/114 |
| 2005/0088141 A1 * | 4/2005 | Lee et al. | 320/114 |
| 2008/0284374 A1 * | 11/2008 | Gardner et al. | 320/115 |

* cited by examiner

*Primary Examiner* — Edward Tso
*Assistant Examiner* — Ahmed Omar
(74) *Attorney, Agent, or Firm* — Alan Kamrath; Kamrath IP Lawfirm, P.A.

(57) ABSTRACT

A flashlight charger includes a bottom plate provided with a pressing element and an electrically conducting part fixedly connected to a top plate that partially covers the pressing element and the electrically conducting part. A flashlight to be charged is aligned and connected with the flashlight charger and then pushed backward relative to the flashlight charger to allow the charging terminals at one end of the flashlight charger to make good electrical contact with the corresponding charging ends of the flashlight while the flashlight is securely fastened with the flashlight charger. When charging is completed, the flashlight can be removed from the flashlight charger rapidly and conveniently. The flashlight charger features good and stable electrical contact in use.

4 Claims, 8 Drawing Sheets

FLASHLIGHT CHARGER

BACKGROUND OF THE INVENTION

1. Technical Field

The present invention relates to chargers and, more particularly, to a flashlight charger which, when used to charge a flashlight configured for illumination, can be firmly connected and maintain good electrical contact with the flashlight through a simple operation and, when charging is completed, allows the flashlight to be removed rapidly and conveniently.

2. Description of Related Art

Nowadays, flashlights for illumination purposes are typically powered by primary batteries, which are non-rechargeable, or secondary batteries, which are rechargeable. A rechargeable flashlight is charged by connection with a charger.

BRIEF SUMMARY OF THE INVENTION

The present invention discloses a new configuration of chargers for use with flashlights designed for illumination purposes. The disclosed charger has a fastening means for forming secure connection and maintaining good electrical contact with a flashlight being charged, and the flashlight can be removed rapidly and easily from the charger when charging is completed. The disclosed charger provides good and stable electrical contact in use.

The primary object of the present invention is to provide a flashlight charger which includes a bottom plate, a pressing element, an electrically conducting part, and a top plate. The resilient pressing element is provided at one end of the bottom plate, has a middle section protrudingly and upwardly provided with a wedge-shaped fastener, and is bilaterally provided with contact portions. The lower end of each contact portion is spaced apart from the bottom plate. The electrically conducting part is installed at the end of the bottom plate where the pressing element is provided. The electrically conducting part has an end facing the wedge-shaped fastener of the pressing element and extended with a plurality of retractable charging terminals. The top plate is fixedly connected to the bottom plate to cover the electrically conducting part and the pressing element while allowing the wedge-shaped fastener and the bilaterally disposed contact portions of the pressing element to jut out of the corresponding holes of the top plate, respectively. The top plate has a predetermined section bilaterally provided with projections that extend inward. On the other hand, a flashlight to be charged by the flashlight charger has a bottom portion concavely provided with a limiting space corresponding in position and shape to the wedge-shaped fastener of the flashlight charger. In addition, the flashlight has a predetermined section bilaterally provided with inverted L-shaped grooves. To charge the flashlight, the inverted L-shaped grooves bilaterally provided on the flashlight are aligned with and inserted by the bilaterally disposed projections of the flashlight charger, respectively. Then, the inverted L-shaped grooves are pushed backward such that the two projections of the flashlight charger enter the horizontal arms of the inverted L-shaped grooves, respectively. At the same time, the wedge-shaped fastener of the flashlight charger enters and engages with the limiting space at the bottom portion of the flashlight. Consequently, the charging terminals at one end of the flashlight charger make good electrical contact with the corresponding charging ends of the flashlight while the flashlight is securely fastened with the flashlight charger. When it is desired to remove the flashlight from the flashlight charger, the contact portions bilaterally provided on the flashlight charger are manually pressed such that the wedge-shaped fastener jutting out of the flashlight charger is moved downward. As a result, the limiting space of the flashlight that corresponds in position to the wedge-shaped fastener is disengaged therefrom. Then, by pushing the flashlight forward, the lower ends of the inverted-L shaped grooves are brought into alignment with the projections of the flashlight charger, respectively, thus allowing the flashlight to be removed upwardly from the flashlight charger.

The second object of the present invention is to provide the foregoing flashlight charger, with each of the charging terminals extended from one end of the electrically conducting part of the flashlight charger having an inner end biased by a spring so each charging terminal is resiliently retractable. On the other hand, the charging ends of the flashlight that correspond in position to the charging terminals are formed as recessed ends. When the charging ends of the flashlight are pressed against the charging terminals of the flashlight charger, respectively, the charging ends push the charging terminals inward and make good electrical contact therewith.

The third object of the present invention is to provide the foregoing flashlight charger further including a spring connected between a projection provided at a predetermined position of the bottom plate and a projection provided in the wedge-shaped fastener of the pressing element. The spring connects the pressing element resiliently to the bottom plate and causes the wedge-shaped fastener and the bilaterally disposed contact portions of the pressing element to extend out of the corresponding holes of the top plate, respectively.

The fourth object of the present invention is to provide the foregoing flashlight charger, with the limiting space at the bottom portion of the flashlight having a rear side formed with a curved guiding portion. When the two projections of the flashlight charger are moved into the horizontal arms of the inverted L-shaped grooves bilaterally provided on the flashlight, the curved guiding portion of the limiting space facilitates entry of the wedge-shaped fastener of the flashlight charger into the limiting space of the flashlight.

The fifth object of the present invention is to provide the foregoing flashlight charger, with the bottom plate of the flashlight charger having one end formed with a through hole. The through hole has a downward opening and is configured for receiving a power cord of the flashlight charger. As the power cord is guided upward through the through hole to the working end of the electrically conducting part rather than being routed in disorder, the flashlight charger looks neat and tidy as a whole.

BRIEF DESCRIPTION OF THE SEVERAL VIEWS OF THE DRAWINGS

The invention as well as a preferred mode of use, further objects, and advantages thereof will be best understood by referring to the following detailed description of an illustrative embodiment in conjunction with the accompanying drawings, in which.

DETAILED DESCRIPTION OF THE INVENTION

Figure 1:
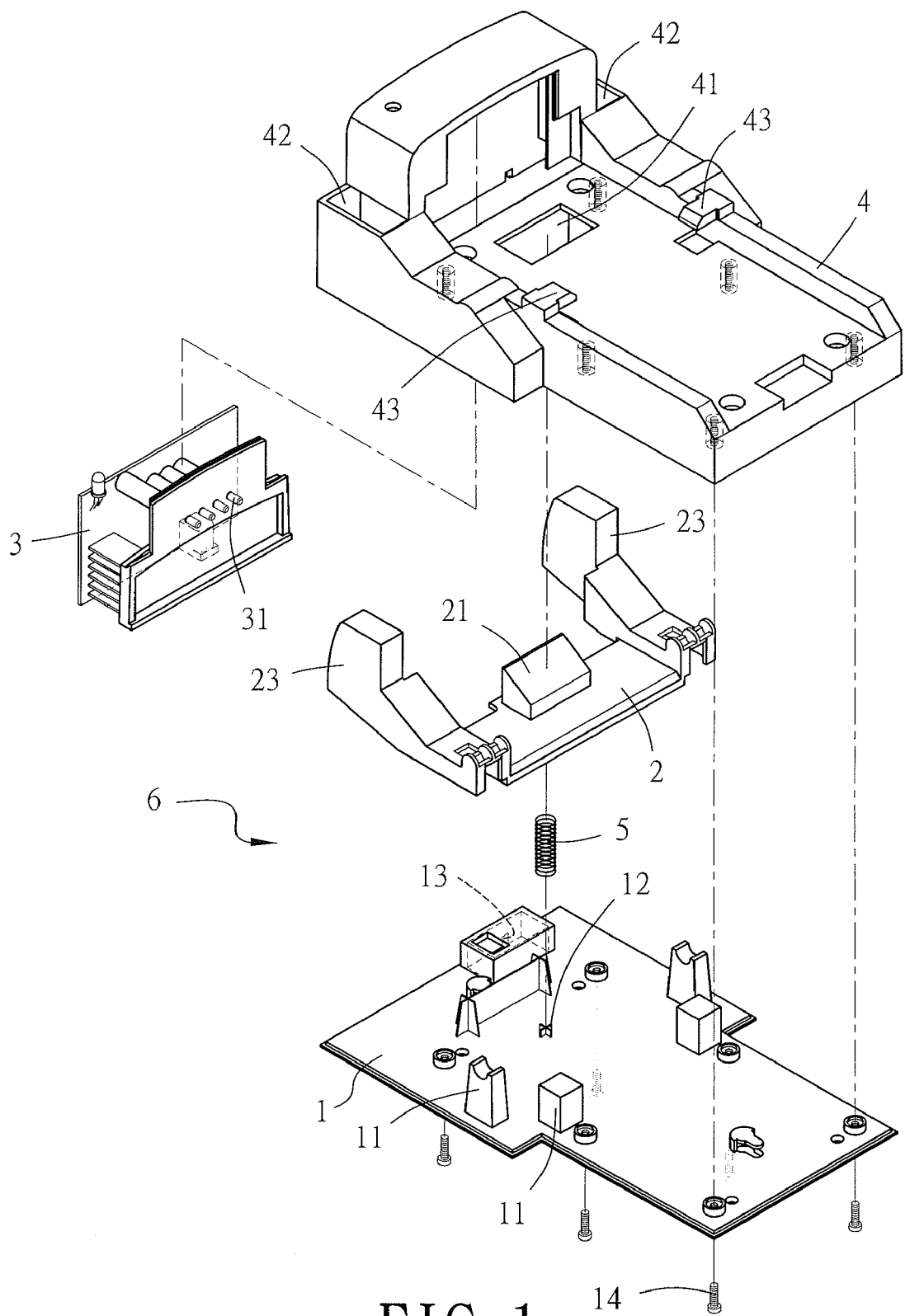
FIG. 1 is an exploded perspective view of a flashlight charger according to the present invention.

Referring to FIG. 1, a flashlight charger 6 according to an embodiment of the present invention essentially includes a bottom plate 1, a pressing element 2, an electrically conducting part 3, and a top plate 4.

The bottom plate 1 is symmetrically and protrudingly provided, at predetermined positions, with a plurality of supports 11 for supporting the pressing element 2. A projection 12 is provided at a predetermined position of the bottom plate 1 and is configured for retaining a spring 5. In addition, a through hole 13 having a downward opening and configured for receiving a power cord is formed at one end of the bottom plate 1.

Figure 3:
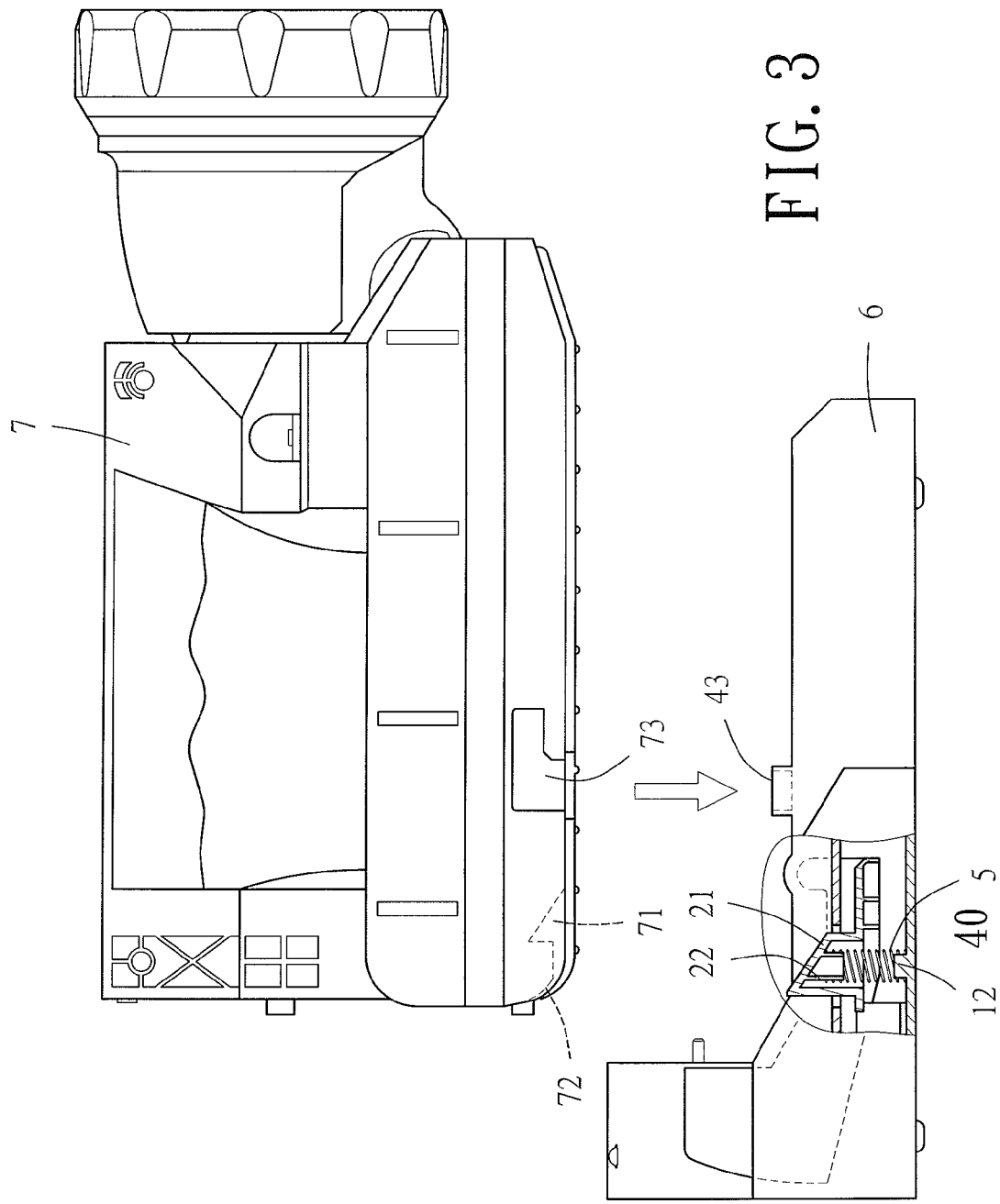
FIG. 3 is a side view of the flashlight charger depicted in FIG. 1 and the flashlight depicted in FIG. 2 that has yet to be connected to the flashlight charger.

The pressing element 2 has a width determined by the width of the bottom plate 1. A wedge-shaped fastener 21 is protrudingly and upwardly provided at a middle section of the pressing element 2. The lower end of the wedge-shaped fastener 21 is extended with a projection 22 for retaining the spring 5, as shown more clearly in FIG. 3. In addition, contact portions 23 are provided on two lateral sides of the pressing element 2, respectively. The lower end of each contact portion 23 is spaced apart from the bottom plate 1, as shown in FIGS. 1 and 3.

Figure 5:
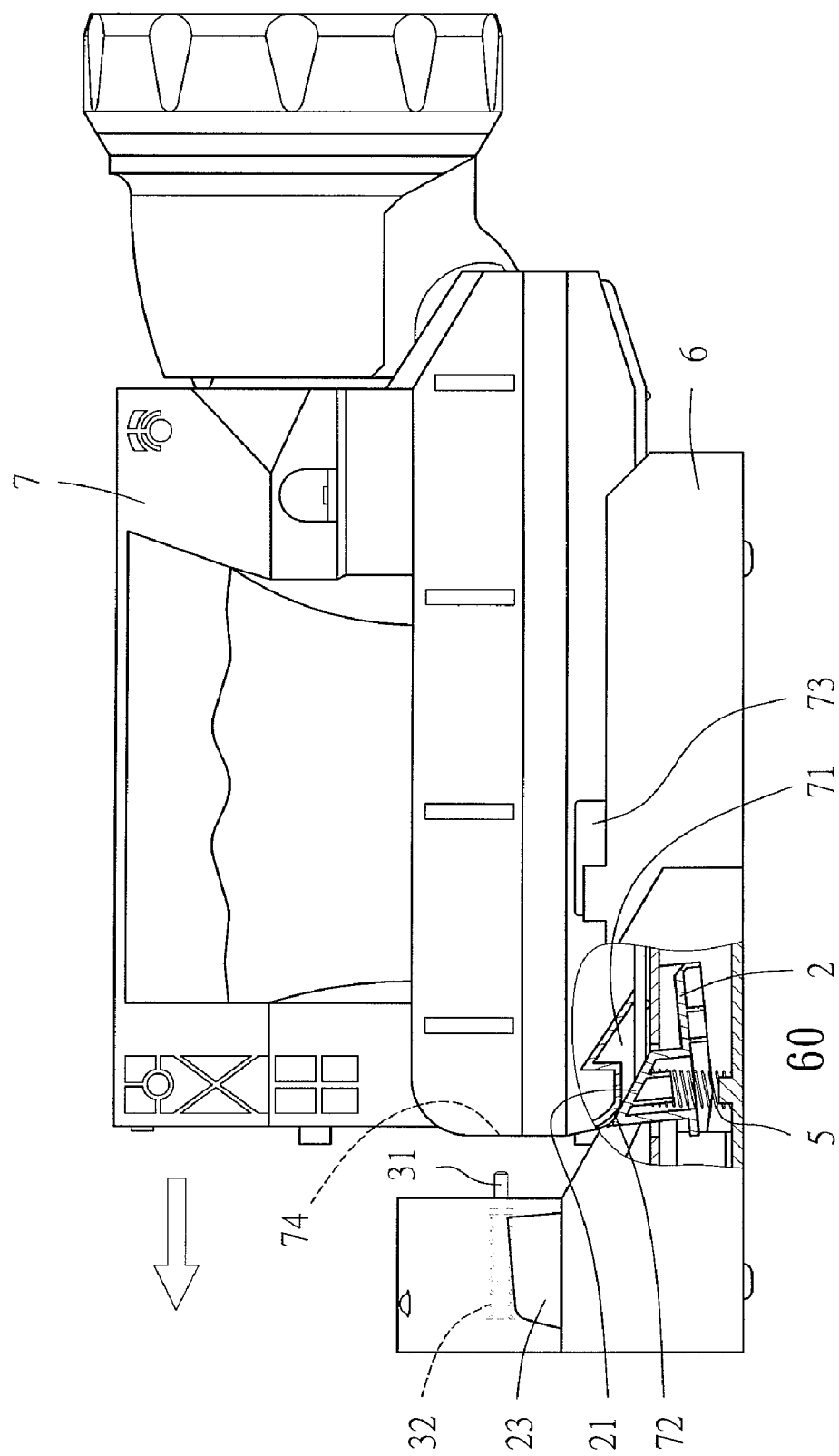
FIG. 5 is a side view showing the first step of connecting the flashlight charger and the flashlight depicted in FIG. 3.

The electrically conducting part 3 is a power conducting element whose width is determined by the space between the two spaced-apart contact portions 23 of the pressing element 2. A plurality of charging terminals 31 protrude from a portion of the electrically conducting part 3 that faces the wedge-shaped fastener 21 of the pressing element 2. Each charging terminal 31 has an inner end biased by a spring 32, as shown in FIG. 5, and is therefore rendered resiliently retractable.

The top plate 4 is a covering element whose shape is determined by the shapes of the bottom plate 1, the pressing element 2, and the electrically conducting part 3. The top plate 4 is penetrated by holes 41, 42 that correspond in position to the wedge-shaped fastener 21 and the contact portions 23 on two lateral sides thereof. Last but not least, projections 43 extend inward from two lateral sides of a predetermined section of the top plate 4.

Figure 2:
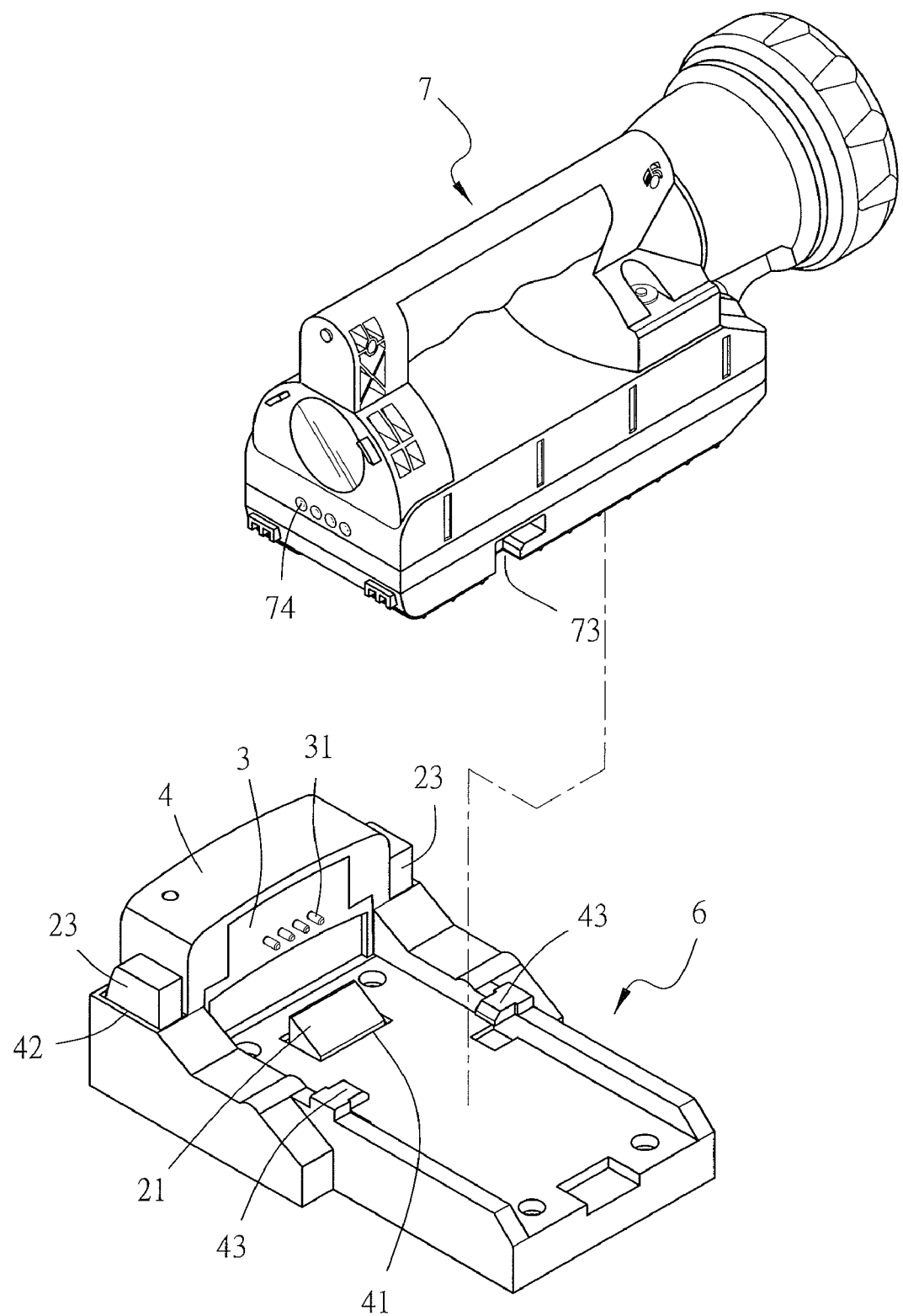
FIG. 2 is a perspective view of the flashlight charger depicted in FIG. 1 and a flashlight to be connected to the flashlight charger.
Figure 4:
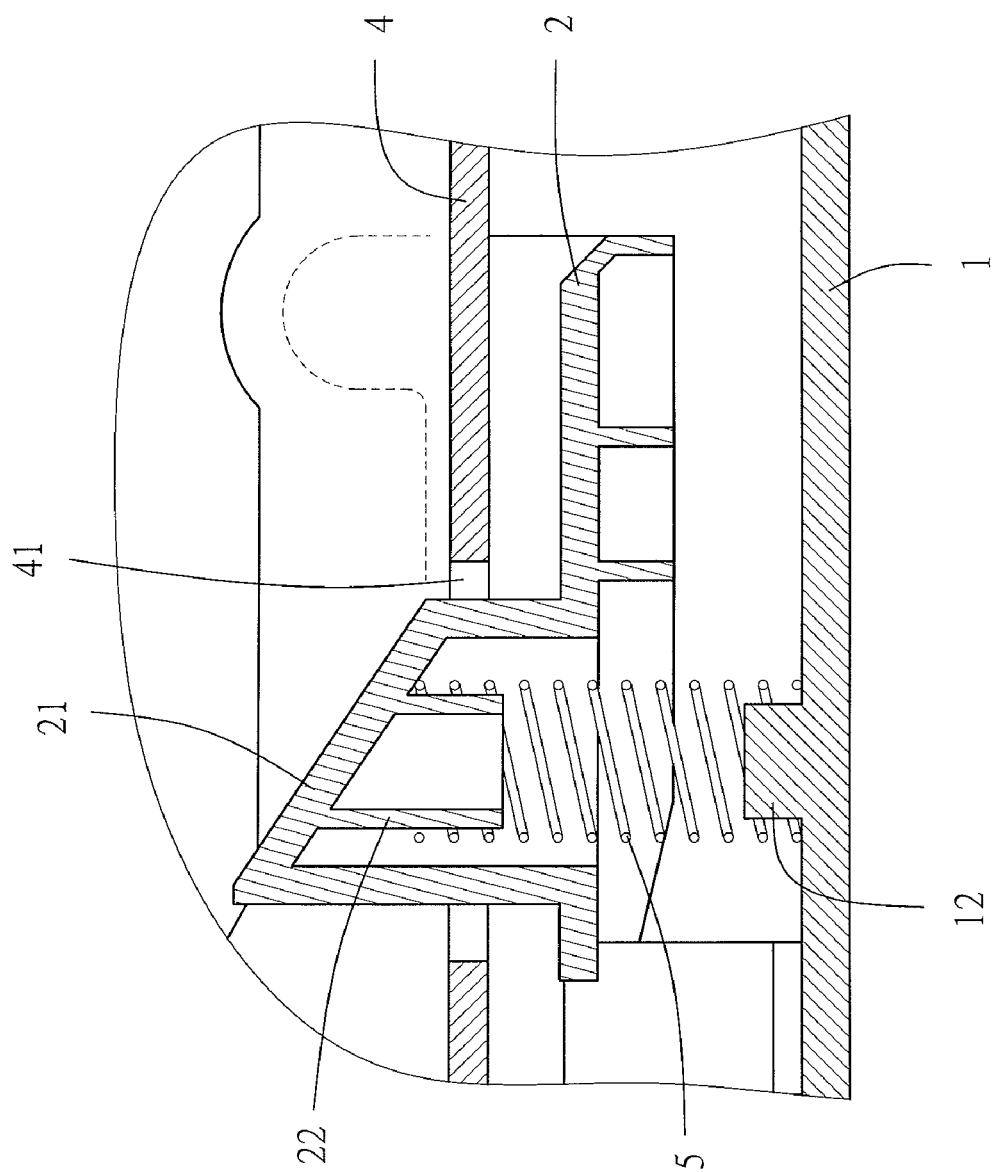
FIG. 4 is a detailed sectional view of the area 40 in FIG. 3.

Assembly of the bottom plate 1, the pressing element 2, the electrically conducting part 3, and the top plate 4 is described hereinafter with reference to FIGS. 1 and 3. To begin with, the two ends of the spring 5 are mounted around the projection 12 of the bottom plate 1 and the projection 22 in the wedge-shaped fastener 21 of the pressing element 2, respectively, as shown more clearly in FIG. 4, thereby connecting the pressing element 2 resiliently to the bottom plate 1. Then, the electrically conducting part 3 is installed at the end of the bottom plate 1 where the pressing element 2 is provided. After that, the top plate 4 is fixedly connected to the bottom plate 1 by a plurality of threaded fasteners 14 to cover the electrically conducting part 3 and the pressing element 2 while allowing the wedge-shaped fastener 21 and the bilaterally disposed contact portions 23 of the pressing element 2 to jut out of the corresponding holes 41, 42 of the top plate 4, respectively, as shown in FIG. 2. Thus, the charger 6 is completed.

Figure 6:
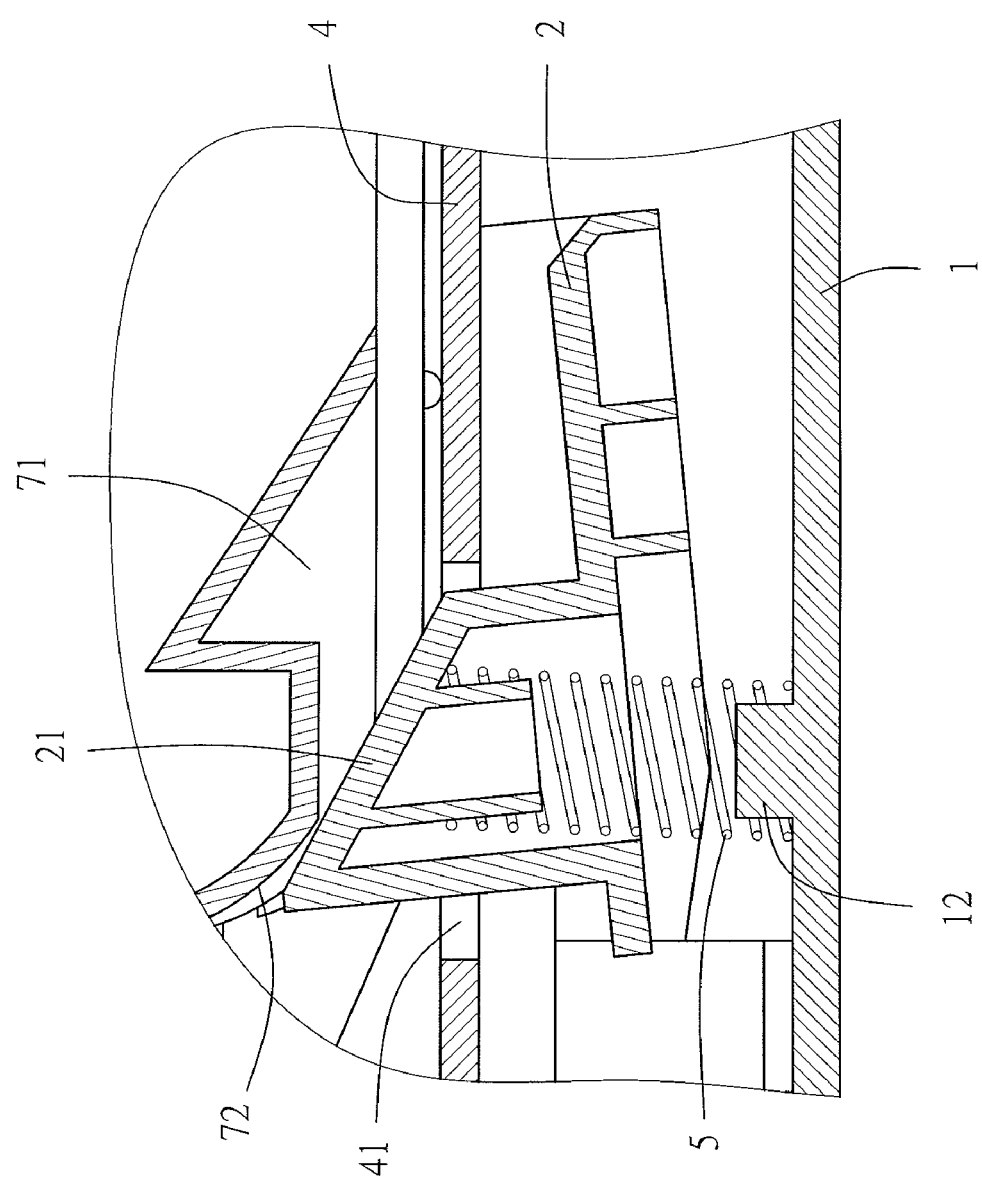
FIG. 6 is a detailed sectional view of the area 60 in FIG. 5.

A flashlight 7 to be charged by the charger 6 has a bottom portion concavely provided with a limiting space 71. The limiting space 71 corresponds in position and shape to the wedge-shaped fastener 21 of the charger 6, as shown in FIG. 5, and has a rear side formed with a curved guiding portion 72, as shown in FIG. 6. Inverted L-shaped grooves 73 are formed on two lateral sides of a predetermined section of the flashlight 7, as shown in FIG. 2. In addition, the flashlight 7 has charging ends 74 formed as recessed ends.

Figure 7:
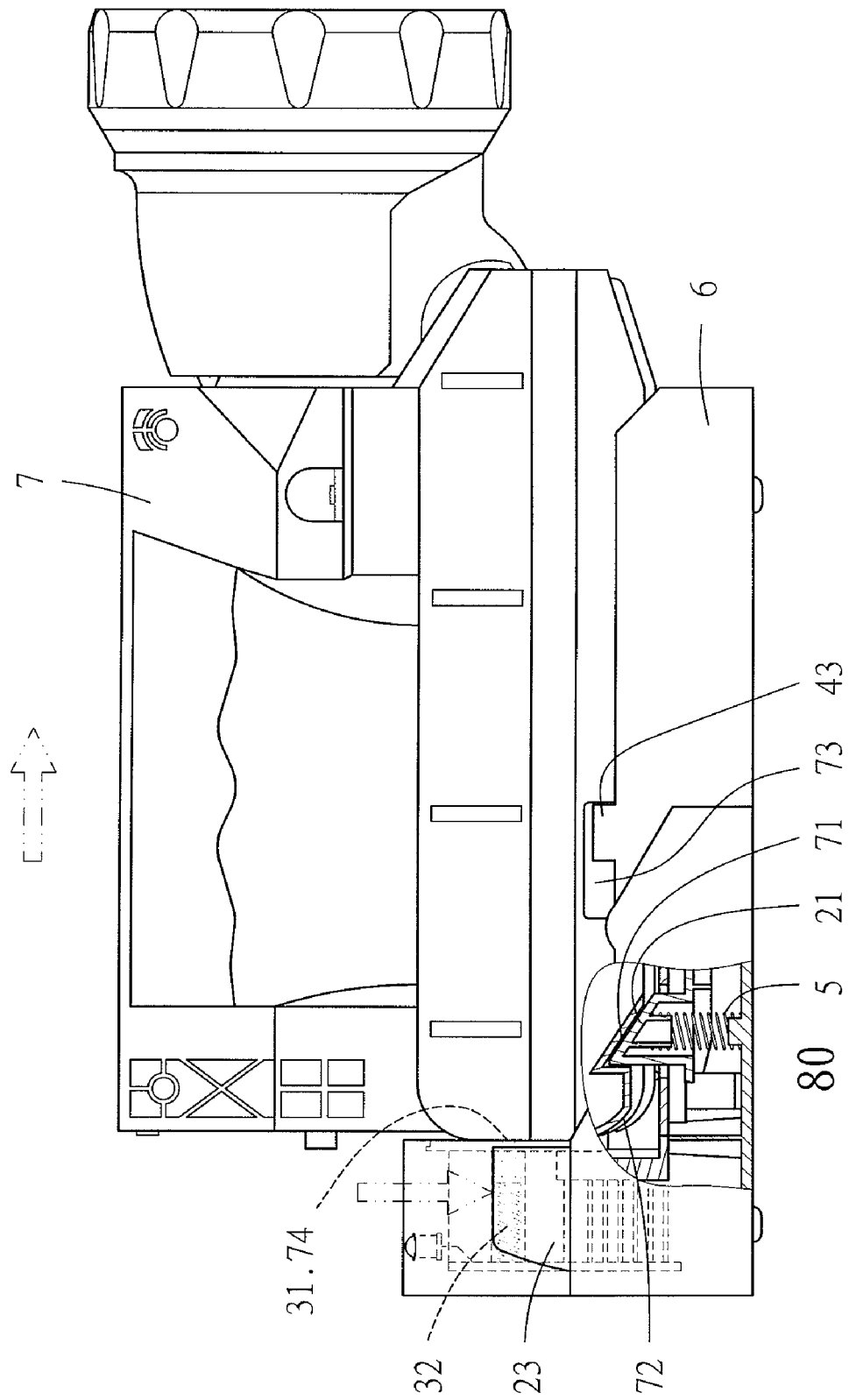
FIG. 7 is a side view showing the completely connected state of the flashlight charger and the flashlight depicted in FIG. 3.
Figure 8:
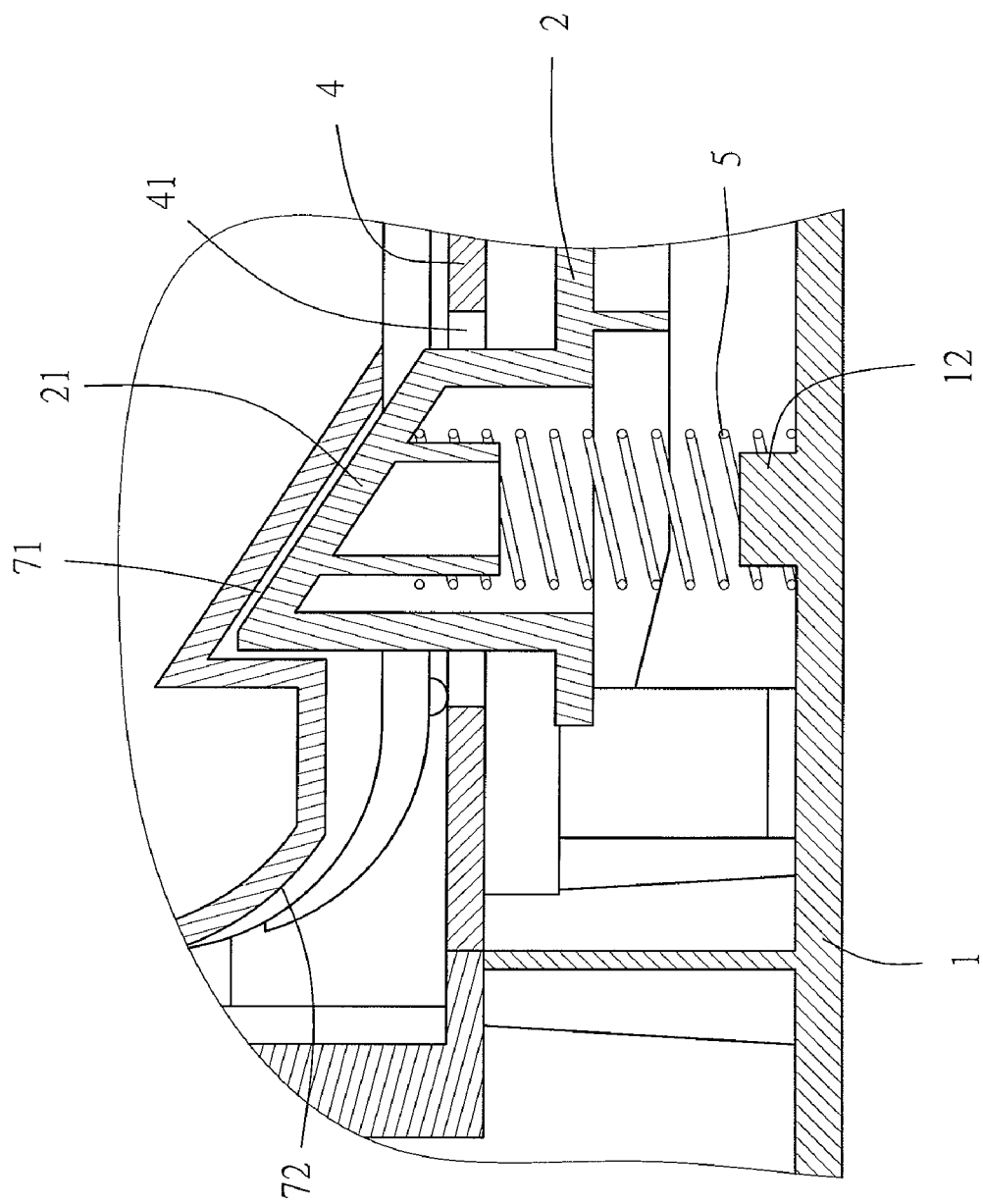
FIG. 8 is a detailed sectional view of the area 80 in FIG. 7.

Referring to FIG. 3, to charge the flashlight 7 with the assembled charger 6, the inverted L-shaped grooves 73 bilaterally provided on the flashlight 7 are aligned with and inserted by the projections 43 extending inward from two lateral sides of the charger 6, as can be seen more clearly in FIG. 5. Then, the flashlight 7 is pushed backward (in the direction indicated by the arrow of FIG. 5) such that the two projections 43 of the charger 6 enter the horizontal arms of the inverted L-shaped grooves 73 of the flashlight 7, respectively. At the same time, by virtue of the curved guiding portion 72 at the rear end of the flashlight 7, the wedge-shaped fastener 21 of the charger 6 is driven smoothly into the limiting space 71 of the flashlight 7, as shown in FIGS. 6, 7. On the other hand, the resiliently retractable charging terminals 31 at one end of the charger 6 are pressed slightly inward by the corresponding charging ends 74 of the flashlight 7. Thus, while the flashlight 7 is securely fastened to the charger 6, as shown in FIG. 8, the charging terminals 31 make good electrical contact with the charging ends 74.

To remove the flashlight 7 from the charger 6, the contact portions 23 on two lateral sides of the charger 6 are manually pressed (in the direction indicated by the downward arrow of FIG. 7) so that the wedge-shaped fastener 21 jutting out of the charger 6 is moved downward, thus allowing the limiting space 71 of the flashlight 7 that corresponds in position to the wedge-shaped fastener 21 to disengage therefrom. Then, the flashlight 7 is pushed forward (in the direction indicated by the rightward arrow of FIG. 7) to bring the lower ends of the inverted L-shaped grooves 73 into alignment with the projections 43 of the charger 6, respectively, (i.e., to the positions shown in FIG. 5), thus allowing the flashlight 7 to be removed upwardly from the charger 6 with ease.

Referring again to FIG. 1, the through hole 13 formed at one end of the bottom plate 1 and configured for receiving the power cord of the charger 6 guides the power cord upward to the working end of the electrically conducting part 3. As the power cord is routed in an orderly manner, the charger 6 as a whole has a neat and tidy look.

What is claimed is:

1. A flashlight charger comprising:

a bottom plate;

a pressing element, which is resilient, is provided at an end of the bottom plate, has a middle section protrudingly and upwardly provided with a wedge-shaped fastener, and is bilaterally provided with contact portions, with each said contact portion having a lower end spaced apart from the bottom plate;

an electrically conducting part provided at the end of the bottom plate that is provided with the pressing element, with the electrically conducting part having an end facing the wedge-shaped fastener of the pressing element and extended with a plurality of retractable charging terminals; and a top plate fixedly connected to the bottom plate to cover the electrically conducting part and the pressing element while allowing the wedge-shaped fastener and the bilaterally disposed contact portions of the pressing element to jut out of corresponding holes of the top plate, respectively, with the top plate having a predetermined section bilaterally provided with projections which extend inward;

wherein the flashlight charger is applicable to a flashlight having a bottom portion concavely provided with a limiting space corresponding in shape and position to the wedge-shaped fastener of the flashlight charger, with the flashlight having a predetermined section bilaterally provided with inverted L-shaped grooves;

wherein in order to charge the flashlight, the bilaterally disposed inverted L-shaped grooves of the flashlight are aligned with and inserted by the bilaterally disposed projections of the flashlight charger, respectively, and are then pushed backward to move the two projections of the flashlight charger into horizontal arms of the inverted L-shaped grooves of the flashlight, respectively, and cause the wedge-shaped fastener of the flashlight charger to enter and fasten with the limiting space at the bottom portion of the flashlight, wherein the charging terminals at one end of the flashlight charger make electrical contact with charging ends of the flashlight, respectively, while the flashlight is securely fastened with the flashlight charger;

wherein in order to remove the flashlight from the flashlight charger, the bilaterally disposed contact portions of the flashlight charger are manually pressed to move downward the wedge-shaped fastener jutting out of the flashlight charger to disengage the limiting space of the flashlight from the wedge-shaped fastener, and then the flashlight is pushed forward to bring lower ends of the inverted L-shaped grooves into alignment with the projections of the flashlight charger and allow the flashlight to be removed upwardly from the flashlight charger; and wherein the limiting space at the bottom portion of the flashlight has a rear side formed with a curved guiding portion which assists the wedge-shaped fastener of the flashlight charger in entering the limiting space of the flashlight when the two projections of the flashlight chargers are moved into the horizontal arms of the bilaterally disposed inverted L-shaped grooves of the flashlight, respectively.

2. The flashlight charger of claim 1, wherein each said charging terminal extended from the end of the electrically conducting part of the flashlight charger has an inner end biased by a spring with each said charging terminal being resiliently retractable, and wherein the charging ends of the flashlight that correspond in position to the charging terminals are formed as recessed ends which, when pressed respectively against the charging terminals of the flashlight charger, push the charging terminals inward and form electrical contact with the charging terminals.

3. The flashlight charger of claim 1, further comprising a spring connected between a projection provided at a predetermined position of the bottom plate and a projection in the wedge-shaped fastener of the pressing element, with the spring connecting the pressing element resiliently to the bottom plate and causing the wedge-shaped fastener and the bilaterally disposed contact portions of the pressing element to jut out of the corresponding holes of the top plate, respectively.

4. The flashlight charger of claim 1, wherein the end of the bottom plate of the flashlight charger is formed with a through hole having a downward opening and configured for receiving a power cord of the flashlight charger, with the power cord being guided upward through the through hole to a working end of the electrically conducting part.

* * * * *